United States Patent [19]

Hsu

[11] Patent Number: 4,890,485

[45] Date of Patent: Jan. 2, 1990

[54] MECHANISM WHICH REACTS TO THE PRESENCE OF OIL AND/OR WATER

[76] Inventor: Charles J. Hsu, P.O. Box 460, Grand Central Station, New York, N.Y. 10017

[21] Appl. No.: 147,702

[22] Filed: Jan. 25, 1988

Related U.S. Application Data

[62] Division of Ser. No. 941,996, Dec. 15, 1986.

[51] Int. Cl.[4] .................... G01N 33/22; G01N 19/10; F03G 7/06; F26B 5/10

[52] U.S. Cl. ...................................... 73/61.1 R; 34/5; 60/721; 92/89; 210/689; 264/321; 525/54.42

[58] Field of Search ............... 264/321, 157; 210/693, 210/924; 426/491; 116/227; 73/53, 61 R; 91/1, 471; 60/721, 705; 92/77, 89, 90, 103 SD; 34/5, 9

[56] References Cited

U.S. PATENT DOCUMENTS

| | | | |
|---|---|---|---|
| 1,045,234 | 11/1912 | Willis et al. | 264/321 X |
| 2,190,376 | 2/1940 | Daley | 264/157 X |
| 2,659,935 | 11/1953 | Hammon | 264/321 |
| 3,012,283 | 12/1961 | Foster | 264/321 X |
| 3,170,178 | 2/1965 | Scholl | 264/321 X |
| 3,194,854 | 7/1965 | Smith | 264/321 X |
| 3,279,380 | 10/1966 | Clark | 340/604 |
| 3,280,549 | 10/1966 | Hsu | 92/172 X |
| 3,392,582 | 7/1968 | Pick et al. | 73/322 |
| 3,394,214 | 7/1968 | Benning | 264/321 |
| 3,427,869 | 2/1969 | Karlbom | 73/73 |
| 3,539,471 | 11/1970 | Sproul | 340/604 |
| 3,544,675 | 12/1970 | Belle Isle | 264/321 |
| 3,553,068 | 1/1971 | Coale | 264/321 X |
| 3,562,731 | 2/1971 | Hsu | 340/604 |
| 3,591,494 | 7/1971 | Crouch et al. | 210/693 X |
| 3,617,566 | 11/1971 | Oshima et al. | 210/693 |
| 3,630,083 | 12/1971 | Gorans | 73/322 |
| 3,634,183 | 1/1972 | Viola et al. | 264/321 X |
| 3,741,210 | 6/1973 | Johnston | 264/321 X |
| 3,745,659 | 7/1973 | Hsu | 33/126.7 R |
| 3,793,672 | 2/1974 | Wetmore | 264/321 X |
| 3,862,963 | 1/1975 | Hoshi et al. | 210/924 X |
| 3,876,494 | 4/1975 | Ogawa et al. | 264/321 X |
| 3,935,099 | 1/1976 | Weaver et al. | 426/491 X |
| 3,951,812 | 4/1976 | Hsu | 116/200 |
| 3,994,115 | 11/1976 | Mako et al. | 264/321 X |
| 4,045,387 | 8/1977 | Fanta et al. | 210/24 X |
| 4,131,773 | 12/1978 | Maham et al. | 73/61.1 R X |
| 4,183,984 | 1/1980 | Browers et al. | 210/924 X |
| 4,246,575 | 1/1981 | Purtell et al. | 200/61.04 X |
| 4,299,883 | 11/1981 | Roth et al. | 264/321 X |
| 4,435,346 | 3/1984 | Ito et al. | 264/321 X |
| 4,448,027 | 5/1984 | Hsu | 60/721 |
| 4,538,787 | 9/1985 | Fox et al. | 264/321 X |

*Primary Examiner*—Philip Anderson
*Attorney, Agent, or Firm*—Edwin D. Schindler

[57] ABSTRACT

A system for the detection of oil or water leakages having a housing with a plurality of openings. The housing is to have a sufficient volume to permit the expansion of an absorbent material when such is placed within it. Additionally the housing is to have a hollow rod extending from it. Running through the rod is a wire. One end of the wire extends into the housing and holds a weighted member. The other end of the wire is connected to means for signaling persons of the presence of the liquid sought to be detected. When an expandable absorbent material is placed in the housing and the material detects the presence of a particular liquid, the absorbent material expands. This expansion forces the weighted member to push the wire through the hollow rod so that the signaling means are activated. In a modification of the present invention, underground leakages in oil and/or water tanks may also be detected and signaled to persons in the area. Absorbent materials are also disclosed for use in the invention, including an absorbent for use in a quench oil tank.

11 Claims, 2 Drawing Sheets

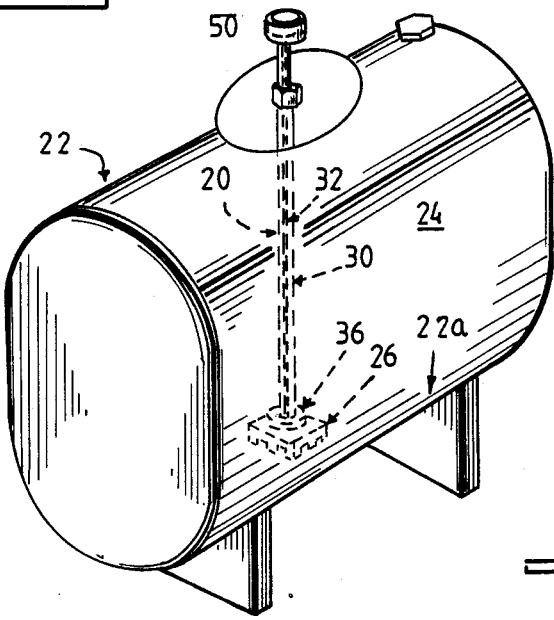
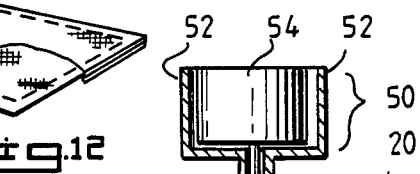
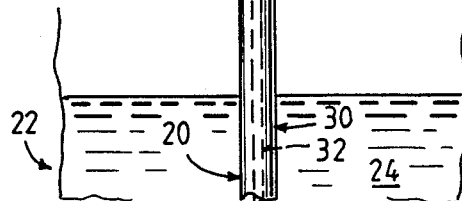
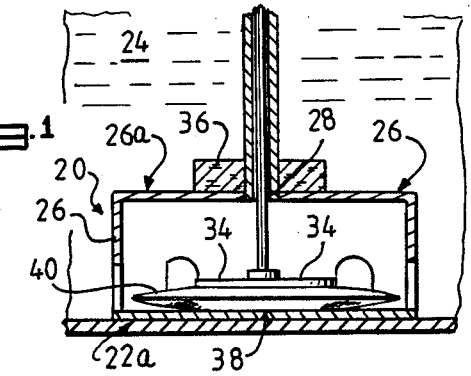
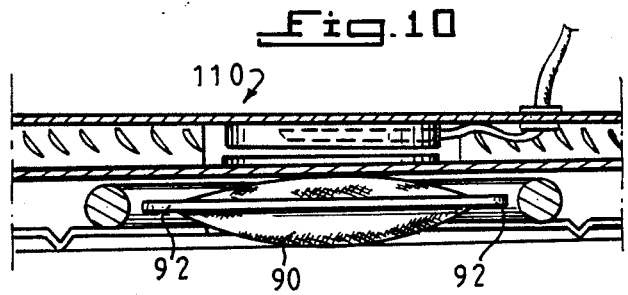
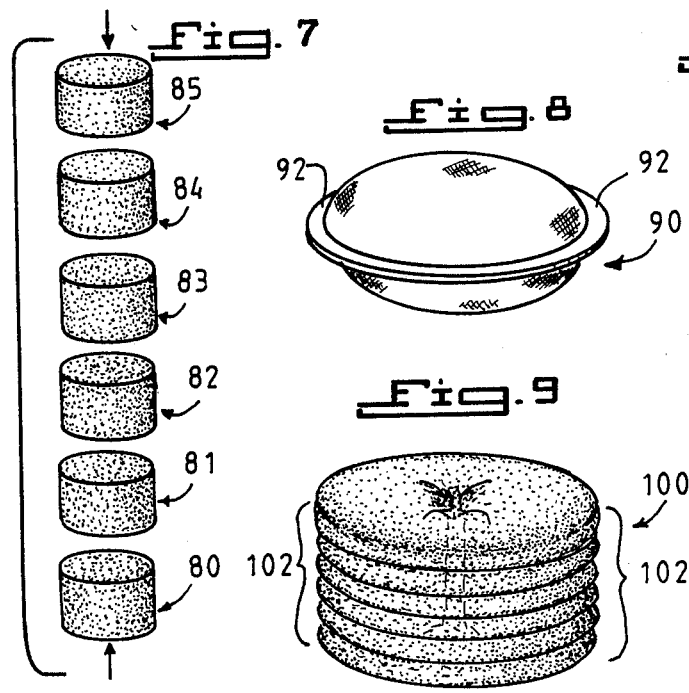
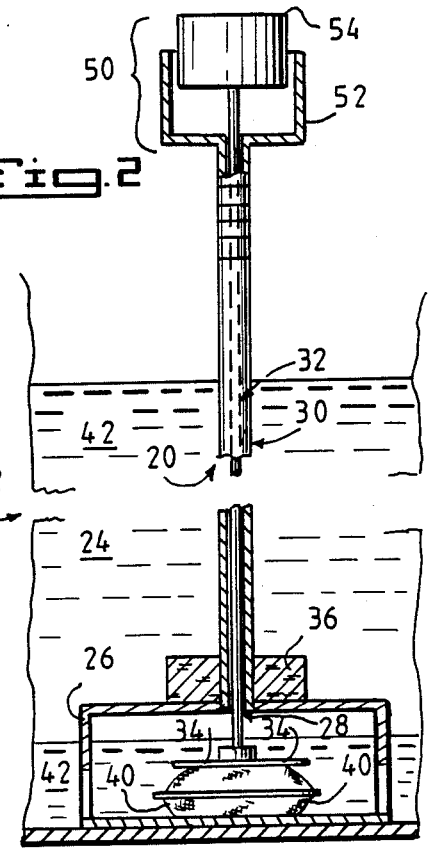

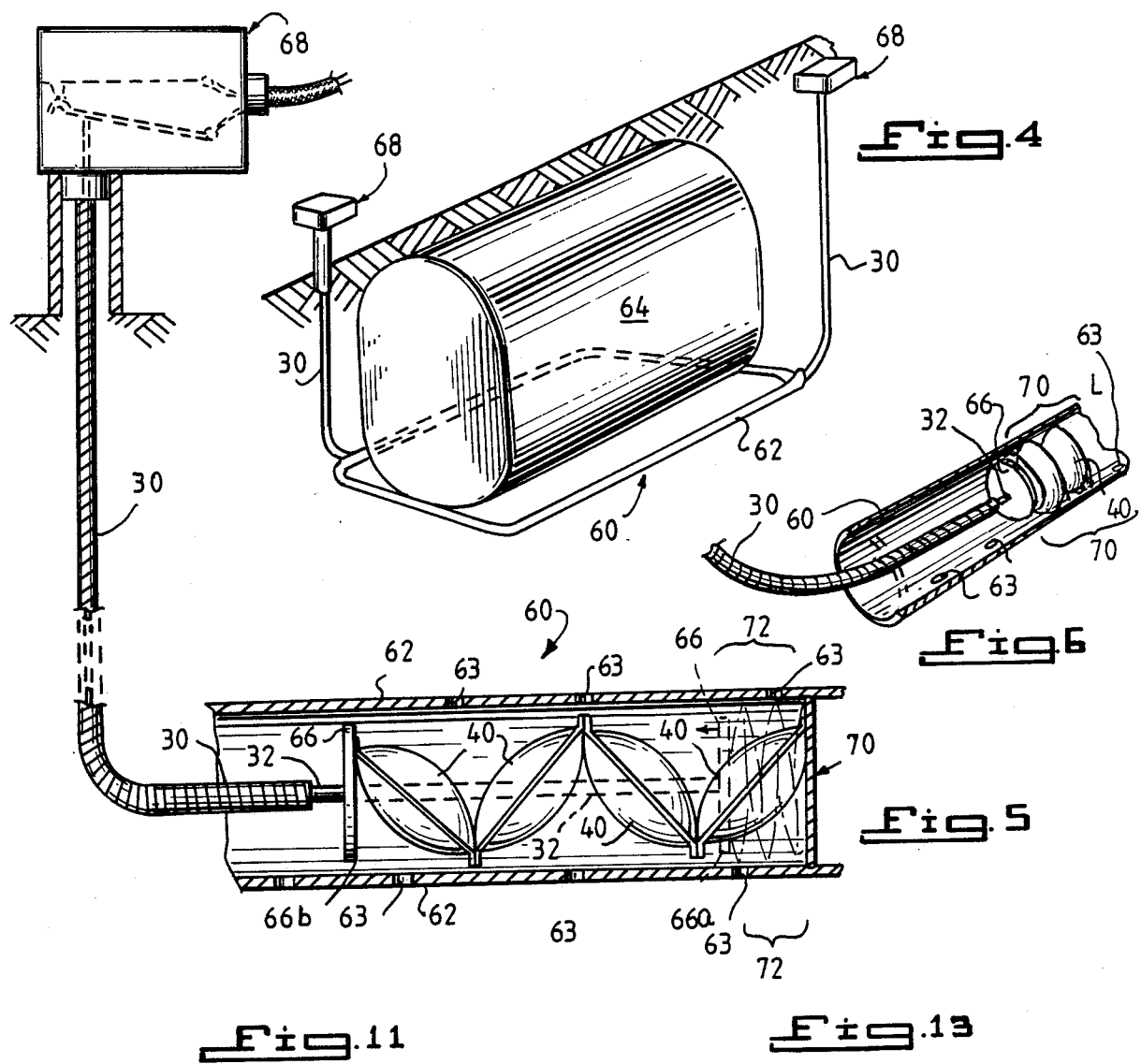
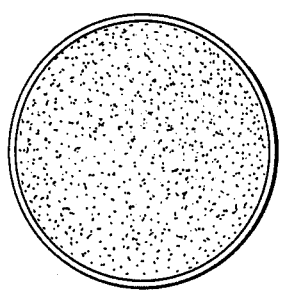
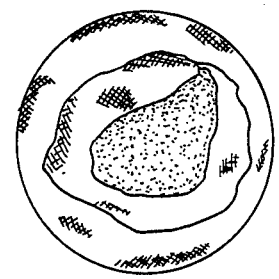

MECHANISM WHICH REACTS TO THE PRESENCE OF OIL AND/OR WATER

This application is a divisional application of application Ser. No. 941,996, filed Dec. 15, 1986.

The present invention relates generally to a system to detect oil and/or water leakages. More particularly, this invention relates to a system that permits the detection of water on the bottom of oil tanks, including quench oil tanks, the detection of oil substances or water on or under boiler room floors or in gas stations, and the like, and new and useful absorbent means for their use therein.

It is well known that it is difficult to detect the presence of water on the bottom of either an ordinary oil tank or a quench oil tank from outside of such a tank. Additionally, the detection of oil substances and water, if such is the case, has also been cumbersome and/or uneconomical. Until the present invention, means for the detection of water in oil have included the use of devices having quite a large number of compartments filled with a water absorbent material which have had to be lowered into and raised from the tank in which the presence of water was to be detected, e.g., U.S. Pat. Nos. 3,745,659; 3,951,812; and 4,419,236, all issued to Applicant herein. The detection of the presence of water in oil could not take place with prior art devices without the removal of such devices through a tank opening, i.e., the sounding of an alarm or other signal outside of a tank when, for example, water was detected in oil did not exist.

Additionally, systems for the detection of oil or water, whether at the bottom of a tank or on a surface, relied upon absorbent materials that were often not well suited for the task. There is, for example, a need for an absorbent material that could absorb water, but not oil, and could withstand the high temperatures present at the bottom of a quench oil tank.

It is, therefore, an object of the present invention to provide a detection system capable of being adapted for the detection of oil and/or water, depending upon the circumstance of concern, and signaling the presence of such liquids to persons in the area.

It is a further object of the present invention to provide absorbent means that are more suitable than presently known means for use in the detection of oil or water.

It is still a further object of the invention to provide an absorbent material that is capable of withstanding extremely high temperatures so that it may be useful in detecting water at the bottom of a quench oil tank.

It is yet a further object of the present invention to provide a suitable covering for the absorbent means employed in the detection system of the present invention and in certain prior art detection systems.

It is an additional object of the present invention to provide a detection system for detecting oil and/or water that is both convenient to use and economical.

Accordingly, the foregoing and related objects of the present invention are achieved by providing an oil and/or water detection system having a housing with, preferably, a plurality of openings to permit the liquid to be detected to fill the housing. The housing should be made of a durable material, preferably metal, and have a base that ensures that it stands upright, e.g., a flat lower surface. The housing is to be placed at the bottom of an oil tank or similar area where the liquid to be detected is thought to possibly exist. The housing is to have a hole in its roof, or upper surface, through which detection means to the outside of the tank, or similar area, are to extend. Such detection means are, preferably, a hollow rod or similar object with a wire running therethrough. The lower end of the wire holds a weighted member, preferably a flat disc. The upper portion of the wire, which is to extend to the outside of the tank, is to hold or connect to signaling means to indicate when the liquid sought to be detected is present.

Detection of a particular liquid is to occur as follows: The housing of the detection means is to have several openings including, preferably, a large opening through the center of the lower surface of the housing. Absorbent means are to be placed in the housing, either on the lower surface of the housing, or preferably, in a center opening in the lower surface of the housing so that the absorbent means are within the confines of the housing. The absorbent means are to rest immediately beneath the weighted member attached to the signaling wire. The weighted member may, but need not, actually contact the absorbent means prior to detection of the liquid sought to be detected. Once in place, the absorbent means, which may be material that absorbs only oil, only water, or both types of liquids, remains undisturbed until the liquid sought to be detected is actually present. When, for example, a water absorbent material detects the presence of water at the bottom of an oil tank, the absorbent material will expand to many, and possibly hundreds of times its original volume. The absorbent material employed, upon expansion, will exert an upward prssure, for example, on the weighted member, located in the housing, affixed to the bottom of the wire. To ensure that the absorbent means forcefully exerts a pressure on the weighted member of the wire, the absorbent means may be enclosed within a porous envelope, which should be a multi-ply material, for example, made out of cotton. The wire, which extends through the hollow rod to the outside of the tank, or similar area, would activate an alarm or some other signal, whether based on sound, sight or light, etc., which will alert persons in the area that, for example, water is present at the bottom of the oil tank of concern.

In a modification of the present invention, oil and/or water absorbent material can be placed in a housing with openings. The housing may then be placed on a surface or beneath a surface, such as, for example, in a gas station where gasoline tanks are located. From at least one portion of the housing, one end of a rod with a wire running therethrough as described above, would be inserted into the housing. The other end of the rod would extend to an area where persons could be alerted as to the detection of the presence of a particular liquid. The end of the wire which is within the housing is provided with a weighted member at its end. This weighted member is preferably a disc. When the liquid to be detected finds its way into the housing, the absorbent material therein will begin to expand. The expansion force exerted by the expanding absorbent material will press against the weighted member affixed to the end of the wire. The wire will be forced through the rod and will activate an alarm or other signaling device to persons in the area that the presence of a particular liquid has been discovered. The dimensions of the housing, which contain the desired absorbent material, may be of any dimensions and will usually depend upon the area in which it is believed that the detection of a particular liquid is possible.

As part of the present invention, certain preferred absorbent means may be used. For example, if one desired to detect the presence of water only, a powdery synthetic super absorbent, which is disclosed in U.S. Patent No. 4,045,387, may be securely wrapped in two or more layers of a porous material such as, for example, cotton. The porous material, containing the desired absorbent would then be placed in the detection system, as described above and as will be described in greater detail hereinafter.

If one desires to detect the presence of water at the bottom of a quench oil tank, one should soak the absorbent material disclosed in the aforesaid patent in water. Once thoroughly soaked in water, one should dry the material. The dried material will retain its ability to absorb water, but not oil, and will have the added benefit of being able to withstand the high temperatures existing at the bottom of a quench oil tank.

If one desires to detect the presence of oil only, one may employ a PM or polyethylene molecular sponge, e.g., the polyethylene molecular sponge sold under the trademark "Sentinel Quick-Sorbs Oil and Gas Wipes", distributed by Sentinel Fitness Products, 130 North Street, Hyannis, Mass. 02601. The use of such a sponge should, preferably, be by the compression of many such sponges into a spherical, oval or similarly shaped object.

Other objects and features of the present invention will become apparent from the following detailed description when taken in combination with the accompanying drawing, which discloses several embodiments of the invention. It is to be understood that the drawing is designed for the purpose of illustration only and is not intended as a definition of the limits of the invention.

In the drawing, wherein similar reference numerals denote similar elements throughout the several views:

FIG. 1 is a partial cross-sectional elevational view of an apparatus, according to the present invention, for detecting, for example, water at the bottom of an oil tank prior to the detection of any water;

FIG. 2 is a partial cross-sectional elevational view of the apparatus of FIG. 1, subsequent to the detection of water, for example, at the bottom of an oil tank;

FIG. 3 is a perspective view of the apparatus of FIG. 1 in an oil tank with the apparatus of the present invention being shown in phantom;

FIG. 4 is a perspective view of an apparatus, according to the present invention, shown in a possible relationshp with a tank containing a liquid, for detecting leakages in underground oil and/or water-containing tanks;

FIG. 5 is a partial, cross-sectional elevational view of the underground liquid detection device, of the present invention, shown in FIG. 4;

FIG. 6 is a cross-sectional, perspective view of the inventive underground liquid detection device of FIGS. 4 and 5;

FIG. 7 is an exploded elevational view of six polyethylene molecular sponges, which absorb oil, but not water, for use in the present invention;

FIG. 8 is a perspective view of the polyethylene molecular sponges of FIG. 1, compressed in a preferred form, according to the present invention for use in the invention;

FIG. 9 is a perspective view of the polyethylene sponges of FIG. 1 compressed in an alternative preferred form, for use in the invention;

FIG. 10 is a cross-sectional, elevational view of the absorbent material shown in FIG. 8 in a prior art device capable of detecting surface moisture;

FIG. 11 is a photograph of a plan view of a synthetic super absorbent material, which will absorb only water, for use in the present invention;

FIG. 12 is a perspective view of a multi-ply porous material containing the synthetic super absorbent material of FIG. 11; and FIG. 13 is a photograph of a plan view of a heat resistant, synthetic super absorbent material for use, for example, in quench oil tanks, according to the present invention.

Turning now in detail to the drawing, FIGS. 1-3 show an oil and/or water detection system 20, according to the present invention, in a tank 22 containing a liquid 24. While the present invention may be adapted for detection of the presence of oil, water or both substances, for convenience in discussing the invention, reference will be made to an oil tank with the liquid sought to be detected in the tank being water. For the purposes of discussion, liquid 24 is, therefore, oil. In FIG. 1, it can be seen that detection system 20 has a durable housing 26, which is preferably made of a metal, and having a base that ensures that it stands upright, i.e., a flat lower surface. The housing 26 is placed on the lower surface 22a of oil tank 22 where water may be present. Housing 26 is to have several openings so that liquid 24 completely fills housing 26. Housing 26 is to have a hole 28 in its upper surface 26a, through which detection means to the outside of tank 22 are to extend. Such detection means are, preferably, a hollow rod 30 with a wire 32 running therethrough. The lower end of wire 32 holds a weighted member, preferably, a flat disc 34. The upper portion of wire 32, which is to extend to the outside of tank 22, is to hold, or otherwise be connected to signaling means to alert those in the area that the liquid sought to be detected, e.g., water in oil, is present. To be sure that rod 30 is held upright, it is preferably, though not essential, to attach a float cork 36 to rod 30. Among the several opening that housing 26 should, preferably, have is opening 38, located centrally through the lower surface of the housing.

Detection of a liquid, for example, water in oil, occurs as follows: An absorbent material 40 is placed in housing 26. If one is attempting to detect water in oil, one should use an absorbent material that would absorb water, but not oil. In other situations, where one would want to detect the presence of oil, one would use an absorbent material. Numerous absorbent materials for use in the present invention are discussed hereinafter. Absorbent material 40 is placed immediately beneath weighted member 34 with the weighted member resting on the absorbent material. When the presence of, for example, water 42 (see FIG. 2) is detected in oil, absorbent material 40, which would only absorb water, would expand as shown in FIG. 2. The expansion pressure of absorbent material 40 would force weighted member 34 upward which, in turn, would force wire 32 upward through rod 30. The upward movement of wire 32 would signal to persons outside of the tank 22, the presence of, for example, water in oil. A preferred signaling means 50 comprises two cups 52, 54 with cup 52 comletely retaining cup 54 within it. Cup 52 is to be fixed to rod 30 so that it remains stationary. Cup 54 is to be fixed to the upper portion of wire 32 with wire 32 passing through cup 52. When absorbent material 40 expands and forces wire 32 upward through rod 30, cup 54, the upper rim of which is originally flush with the rim of cup 52, is partially raised out of cup 52, thereby visually alerting persons that, for example, water exists in an oil tank. It will be obvious to those persons skilled in the art that countless signaling means, both visual and audio, are possible as the alert mechanism The invention isn't so limited to that shown in the drawing. So that the absorbent material, once expanded, can be replaced with an unexpanded absorbent material (thereby allowing a new detection to take place) tank 22 is to have an opening that is sufficiently wide to permit the insertion and removal of the inventive detection device.

FIGS. 4–6 present a modification of the present invention wherein the inventive liquid detection system may be modified to that designated by reference numeral 60. Apparatus 60 is intended for the detection of underground leakages in water or oil tanks. As shown in FIG. 4, this apparatus may be placed in relation to an underground tank 64 (as used in a gas station) so that it encircles it. This apparatus included a rigid housing 62 with openings 63. This housing is, preferably, cylindrical though other shapes are possible. Within the housing is a weighted member, which in the modification of the present invention shown in FIGS. 4–6, will be designated by reference numeral 66. This weighted member is preferably a circular disc. Referring, particularly, to FIG. 5, weighted member 66 is affixed to the lower end of a wire 32, which runs through a hollow rod 30. The upper end of wire 32, within rod 30, is in contact with signaling or alarm means 68. Signaling means 68 is located at or above ground level so that the presence of an underground leakage from tank 64 may be signaled to persons in the area. A variety of signaling means may be employed, such as those means discussed in relation to the embodiment of the present invention shown in FIG. 1–3. Prior to the detection of a leakage from tank 64, weighted member 66 is in an initial position, as designated by reference numeral 66a (shown in phantom in FIG. 5). Within housing 62, to the side of weighted member 66 that faces away from the signaling means and extending to a rigid wall 70, said area being designated by numeral 72 is placed absorbent material 40. A sufficient quantity of absorbent material 40 is placed in area 72 so that it completely fills area 72 between weighted member 66 and wall 70. The type of absorbent material used will depend upon the type of liquid sought to be detected. Upon a leakage from tank 64, liquid from the tank will seep through openings 63 and into area 72 of housing 62. This seepage will cause absorbent material 40 to expand thereby exerting an expansion pressure upon weighted member 66 that presses weighted member 66 from position 66a toward 66b. This displacement of weighted member 66, in turn causes wire 32 to move upward through rod 30 thereby activating the signaling means 68 necessary to alert persons in the area of the presence of a leakage from underground tank 64. The absorbent material must then be replaced and means for its removal from below ground are necessary. A plurality of the arrangements shown in FIG. 5 are possible (see FIG. 4).

Turning now to consideration of the absorbent materials which may be used in the present invention, for the detection of water, a release mechanism that is activated in water, but not oil, is fully disclosed in Applicant's prior art patent, U.S. Pat. No. 3,280,549, issued on Oct. 25, 1966, said disclosure being incorporated by reference herein. The release mechanism of U.S. Pat. No. 3,280,549, includes an expandable powder made from a plant called "Sterculia lychnophora Hance," and if dried and ground or pulverized, can expand to more than fifteen times its volume when immerged in water. Other water absorbent materials are also discussed in Applicant's U.S. Pat. Nos. 3,745,659; 3,951,812; and 4,419,236. Other absorbent materials may, of course, also be employed in the present invention. Some of the absorbent materials for use in the invention will now be discussed.

FIG. 7 shows six cylindrical polyethylene molecular ("PM") sponges 80, 81, 82, 83, 84, 85, which are distributed by Sentinel Fitness Products that are capable of absorbing oil, but not water, up to 32 times their volume. For use in the present invention, such as the modification shown in FIGS. 4–6 it is preferable that approximately six of the PM sponges, shown in FIG. 7, be compressed in a fashion as shown in either FIG. 8, as designated by reference numeral 90, or FIG. 9, as designated by the reference numeral 100. Absorbent material 30 is made by compressing the edges of PM sponges 80, 81, 82, 83, 84, 85 while they retain their oval shape, the edges of the sponges should be compressed so that a cardboard-thin rim 92 is formed. It should be emphasized that the embodiment shown in FIG. 8 for an oil absorbent sponge is also possible for a water absorbent sponge.

FIG. 9 illustrates another embodiment 100 of how the PM sponges of FIG. 7 may be compressed for use in the present invention. The PM sponges 80, 81, 82, 83, 84, 85 are compressed vertically at their centers. The advantages of this embodiment is that absorbent material 100 has a greater ability for absorbing oil along its curved side 102. It should be noted that rim 92 of absorbent material 90 is incapable of absorbing oil because it is compressed to the point of being cardboard thin. This is in accordance with the rule that all materials so compressed will lose any ability they may have had to absorb oil.

Finally, it should be noted that the absorbent materials 90 and 100 in FIGS. 8 and 9, respectively, may be formed by compressing any number of PM sponges (or other absorbent material, though the compression of six sponges is preferred.

FIG. 10 shows the use of absorbent material 90 in a prior art device developed by Applicant for detecting surface water. This prior art detection device 110 is fully disclosed in U.S. Pat. No. 3,562,731, issued Feb. 9, 1971; the disclosure of this patent being fully incorporated by reference into the present disclosure. It should be pointed out that device 110 may be used to detect surface water or oil, depending upon the type of expandable absorbent material used in the device. Absorbent material 90 may be placed in device 110, as illustrated in FIG. 4. Upon the presence of a surface liquid, such as oil, absorbent material 90 will expand. The pressure caused by the expansion force of the absorbent material will trigger an electric signal or alarm.

FIG. 11 shows a known synthetic super absorbent powdery material which expands greatly in the presence of water, but not oil, and which is also available for use in the detection system of the present invention. The water absorbent substance shown in FIG. 11 is fully disclosed in U.S. Pat. No. 4,045,387, issued Aug. 30, 1977, and is incorporated by reference herein. This water-absorbent material of U.S. Pat. No. 4,045,387 is a flour-polyacrylonitrile graft polymer composition. This powdery substance may conveniently be employed in the detection system of the present invention by fully enclosing this substance in a multi-ply porous material that is capable of sufficient expansion, e.g., cotton (see FIG. 12). A multi-ply porous container 120 is advisable in order to sufficiently contain the expansion force of this absorbent substance which is capable of expanding to greater than 100 times its volume. Without a proper container, such as the one illustrated in FIG. 12, the expansion force of this absorbent powdery substance might not be properly directed in the apparatus shown in FIGS. 1-6 and 10 to efficiently trigger the alarm mechanisms.

Finally, the water absorbent substance shown in FIG. 11 may be modified for use in the apparatus shown in FIGS. 1-6 to detect water, for example, at the bottom of a quench oil tank. As is well known to persons skilled in the art, temperatures at the bottom of a quench oil tank can be extremely high. The absorbent disclosed in U.S. Pat. No. 4,045,387 (see FIG. 11) cannot withstand such temperatures. By soaking this water absorbent substance in water, then drying this substance, preferably by freeze drying, this substance will then be modified to withstand such high temperatures, as those that exist at the bottom of a quench oil tank. This substance is shown in FIG. 13. For use in the apparatus of the present invention, this substance may be placed in any commercially available expandable (preferably, multi-ply) container capable of withstanding the necessary temperatures, e.g., porous cotton material.

While only several embodiments of the present invention have been shown and described, it will be obvious to those skilled in the art that numerous modifications may be readily made thereunto without departing from the spirit and scope of the invention.

What is claimed is:

1. A release mechanism which reacts to the presence of water at a temperature which is present in a quench oil tank, comprising:
    a flour-polyacrylonitrile graft polymer composition as an absorbent material, said flour-polyacrylonitrile graft polymer composition being treated by being soaked in water and then subsequently dried; and,
    a multi-ply porous container for substantially enclosing said absorbent material.

2. A process for producing a water absorbent release mechanism material which reacts to the presence of water at a temperature which is present in a quench oil tank, comprising the steps of:
    soaking in water a flour-polyacrylonitrile graft polymer composition; and,
    drying said flour-polyacrylonitrile graft polymer composition.

3. The process according to claim 2, wherein said drying step is carried out by freeze-drying.

4. A release mechanism which reacts to the presence of oil, comprising:
    at least one polyethylene molecular sponge for use as an oil-only absorbing material, said plurality of polyethylene molecular sponge being compressed at only a portion of said polyethylene molecular sponge.

5. The release mechanism according to claim 4, wherein a plurality of said polyethylene molecular sponges are employed.

6. The release mechanism according to claim 5, wherein said plurality of polyethylene molecular sponges are compressed at their perimeters to one another.

7. The release mechanism according to claim 5, wherein said plurality of polyethylene molecular sponges are compressed at their centers to one another.

8. A release mechanism which reacts to the presence of oil and water, comprising:
    at least one polyethylene molecular sponge for use as an oil-only absorbing material, said polyethylene molecular sponge being compressed together at only a portion said polyethylene molecular sponge;
    a flour-polyacrylonitrile graft polymer composition as an absorbent material, said flour-polyacrylonitrile graft polymer composition being treated by being soaked in water and then subsequently dried; and,
    a multi-ply porous container for substantially enclosing said treated flour-polyacrylonitrile graft polymer composition and said compressed polyethylene molecular sponge.

9. The release mechanism according to claim 8, wherein a plurality of said polyethylene molecular sponges are employed.

10. The release mechanism according to claim 9, wherein said plurality of polyethylene molecular sponges are compressed at their perimeters to one another.

11. The release mechanism according to claim 9, wherein said plurality of polyethylene molecular sponges are compressed at their centers to one another.

* * * * *